No. 861,065. PATENTED JULY 23, 1907.
T. P. VUNCANNON.
NUT LOCK.
APPLICATION FILED APR. 3, 1907.
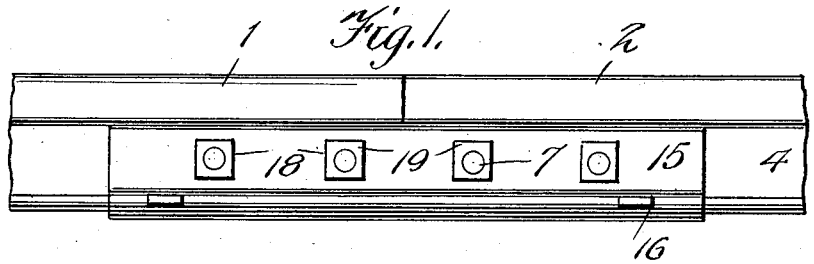
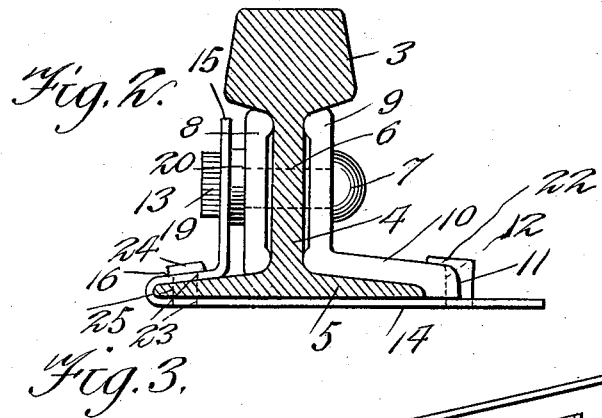
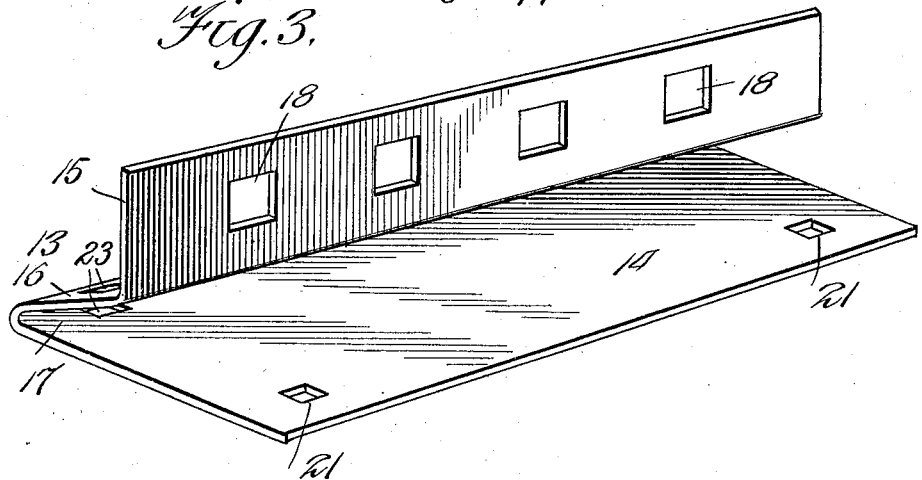
Inventor
Thomas P. Vuncannon,
Witnesses
Geo. Ackman Jr.
E. Bradway
By Victor J. Evans
Attorney
THE NORRIS PETERS CO., WASHINGTON, D. C.

UNITED STATES PATENT OFFICE.

THOMAS PETER VUNCANNON, OF VAN VLECK, TEXAS.

NUT-LOCK.

No. 861,065.　　　Specification of Letters Patent.　　　Patented July 23, 1907.

Application filed April 3, 1907. Serial No. 366,226.

*To all whom it may concern:*

Be it known that I, THOMAS PETER VUNCANNON, a citizen of the United States, residing at Van Vleck, in the county of Matagorda and State of Texas, have invented new and useful Improvements in Nut-Locks, of which the following is a specification.

This invention relates to nut locks especially designed for rail joints for preventing the nuts of fish plate bolts from jarring loose.

The invention has for one of its objects to improve and simplify the construction of nut locks so as to be comparatively easy and inexpensive to construct, having their parts so designed that the rails can be readily joined or disconnected with a minimum of labor and trouble.

A further object of the invention is the provision of a rail joint having a nut lock applied thereto for assisting in giving stability to the rail joint and preventing the nuts from working loose.

With these objects and others in view, as will appear as the description proceeds, the invention comprises the various novel features of construction and arrangement of parts, which will be more fully described hereinafter and set forth with particularity in the appended claims.

In the accompanying drawing, illustrating one of the embodiments of the invention:—Figure 1 is a side elevation of the rail joint with the nut lock applied thereto. Fig. 2 is a transverse section drawn on an enlarged scale. Fig. 3 is a perspective view of the combined nut locking member and supporting plate for the meeting ends of the rails.

Similar reference characters are employed to designate similar parts throughout the several views.

Referring to the drawing, 1 and 2 designate the meeting ends of two adjacent rails which are of usual construction comprising a head 3, web 4 and base 5, the web being provided with bolt receiving apertures 6, through which the fish plate bolts 7 pass.

As shown in Fig. 2, one of the fish plates 8 is of ordinary construction, while the other fish plate 9 has a laterally inclined longitudinal plate 10 engaging the top side of one-half of the base 5, the outer edge of the plate 10 being flanged downwardly to fit over the adjacent edge of the rail base. The bolts 7, of which there may be any desired number, pass through the fish plates and webs of the rails to hold the meeting ends together and prevent relative lateral displacement. The downwardly flanged edge 11 of the fish plate 9 has spiked receiving apertures 12, whereby the spikes that are driven into the ties serve to hold the said fish plate as well as the rails in position.

The means for locking the nuts comprises a sheet metal body 13 having a certain resiliency, which is bent to form a supporting plate 14 that extends under the rails at their meeting ends and a vertically extending plate 15 and a connecting portion 16 bent back over one edge of the plate 14, so as to form a pocket 17, into which the rail bases extend. The connecting portion 16 is of such dimension that when the parts are in position a space is provided between the upwardly extending plate 15 and an adjacent fish plate, as shown in Fig. 2. The plate 15 has non-circular apertures 18 for receiving nuts 19 of the fish plate bolt 7.

Arranged on the shanks of the bolt 7 and interposed between the plates 8 and 15 are washers 20 of any approved construction.

As shown in Fig. 3, the plate 14 has apertures 21 for receiving the spikes 22, as shown in Fig. 2, so that the nut lock is rigidly secured in place. Furthermore, the connecting portion 16 and the plate 17 are provided with registering apertures 23 for receiving the spikes 24 on the opposite sides of the rails, the said spikes passing through apertures 25, provided in the bases of the rails. It will thus be seen that the vertical plate 15 of the nut locking member will be positively held in place by the spikes 24 and that said nut locking member coöperates with the fish plate of the joint to hold the rails in perfect alinement.

From the foregoing description taken in connection with the accompanying drawing, the advantages of the construction and method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made when desired as are within the scope of the appended claims.

What is claimed, is:—

1. A rail joint comprising a pair of rails, fish plates therefor, bolts passing through the fish plates and rails, in combination with a nut locking member comprising a sheet metal structure bent into a supporting plate disposed under the meeting ends of the rails, and a vertically extending plate having apertures for engaging the nuts of the bolts, said supporting plate having apertures for receiving spikes for holding the rails in position.

2. A rail joint comprising a pair of rails, fish plates, bolts extending through the rails and fish plates, and washers on the bolts, in combination with a nut locking member comprising a metal structure bent into a supporting plate disposed under the rail and a vertical plate disposed parallel with one of the fish plates and bearing against the washers and having apertures for receiving the nuts of the bolts, the supporting plate having spike receiving apertures.

3. A rail joint comprising a pair of rails, fish plates, one having a lateral extension at its bottom for engaging the bases of the rails provided with longitudinal notches, and bolts passing through the fish plates and rails, in combination with a nut locking device composed of a single metal structure bent into a horizontal supporting plate disposed under the meeting ends of the rails and having apertures adapted to register with the notches of the said fish plate, a vertical plate having apertures for receiving the nuts of the bolts and a connecting portion between the plates, said connecting portion and supporting plate having apertures to register with the spike receiving apertures of the bases of the rail whereby the spikes hold the nut engaging plate in position.

In testimony whereof, I affix my signature in presence of two witnesses.

THOMAS PETER VUNCANNON.

Witnesses:
W. W. O'NEAL,
J. R. COOKENBOO.